United States Patent [19]

Bopp

[11] Patent Number: 4,496,034
[45] Date of Patent: Jan. 29, 1985

[54] VISCOUS COUPLING FOR TORQUE CONVERTER BYPASS

[75] Inventor: Warren G. Bopp, Farmington Hills, Mich.

[73] Assignee: Eaton Corporation, Cleveland, Ohio

[21] Appl. No.: 388,557

[22] Filed: Jun. 15, 1982

[51] Int. Cl.³ .............................................. F16D 39/00
[52] U.S. Cl. .................................. 192/3.28; 192/58 B; 192/48.3
[58] Field of Search ....................... 192/3.28, 3.29, 3.3, 192/3.31, 3.32, 3.33, 58 B, 58 A, 58 R, 48.3, 106.2; 74/732

[56] References Cited

U.S. PATENT DOCUMENTS

| | | | |
|---|---|---|---|
| 4,027,757 | 6/1977 | Radke et al. | 192/106.2 |
| 4,138,003 | 2/1979 | Malloy | 192/3.29 |
| 4,167,993 | 9/1979 | Vukovich et al. | 192/3.3 |
| 4,181,203 | 1/1980 | Malloy | 192/3.3 |
| 4,274,519 | 6/1981 | Moroto et al. | 192/3.28 |
| 4,317,510 | 3/1982 | Staub, Jr. | 192/58 B |
| 4,423,803 | 1/1984 | Malloy | 192/3.29 |

*Primary Examiner*—George H. Krizmanich
*Attorney, Agent, or Firm*—C. H. Grace; P. S. Rulon

[57] ABSTRACT

A bypass drive line for a torque converter type automatic transmission in which the bypass drive line includes a viscous coupling. The viscous coupling is of a sandwich construction including an annular body member, an annular cover member secured at its outer periphery to a side face of the outer peripheral portion of the body member and spaced axially from the body member to define a viscous fluid chamber therebetween, and an annular clutch member disposed in the chamber and having a central hub portion adapted to be drivingly connected to the output shaft of the torque converter. The drive into the coupling from the housing of the torque converter is through an annular clutching surface defined on the side face of the radially outer peripheral portion of the body member radially outwardly of the outer periphery of the cover member. The body member includes a central hub portion which is journaled on the central hub portion of the clutch member and the radially innerperiphery of the cover member is sealed to the clutch member in non load-bearing relation so that the entire radial and thrust loading of the body member and cover member are carried at the journal between the hub portions of both the body member and the clutch member.

18 Claims, 3 Drawing Figures

VISCOUS COUPLING FOR TORQUE CONVERTER BYPASS

BACKGROUND OF THE INVENTION

This invention relates to automatic torque converter transmissions for motor vehicle applications. More particularly, it relates to automatic torque converter transmissions having means to selectively bypass the torque converter and, even more particularly, to a viscous coupling utilized in a torque converter bypass.

Torque converter type automatic transmissions have achieved almost universal application and acceptance in motor vehicles. While generally satisfactory in this application, torque converter automatic transmissions embody inherent slip and therefore incorporate inherent losses in vehicular fuel economy. In an effort to minimize this slippage and thereby optimize fuel economy, various efforts have been made to bypass the torque converter with some manner of direct drive which is typically brought into play when the vehicle is operating in the higher gear ratios and above a predetermined vehicular speed. While these direct drive bypass arrangements have resulted in improvements in fuel economy, they have also, under certain conditions, served to transmit various drive line vibrations to the passenger compartment of the motor vehicle, resulting in a derogation in the ride quality of the vehicle. In an effort to provide a bypass arrangement that would not transmit drive line vibrations to the passenger compartment, it has been proposed that a viscous coupling be employed in the bypass drivetrain. While the use of the viscous coupling in the bypass drivetrain does serve to minimize transmission of drive line vibrations to the passenger compartment, it is imperative that the coupling be designed for maximum efficiency so that losses in the coupling itself cannot significantly offset the fuel economy gains achieved by the use of the bypass.

SUMMARY OF THE INVENTION

Accordingly, it is the object of the present invention to provide a simple and efficient viscous coupling for use as a bypass in a torque converter transmission.

The torque converter viscous bypass coupling of the present invention is of the type including an annular body member, an annular cover member coacting with the body member to define an annular chamber for receiving a viscous fluid, and an annular clutch member disposed within the chamber in viscous driving relation to the body member and having a hub portion adapted to be drivingly connected to the output shaft of the torque converter.

According to one feature of the invention, the body member has a central hub portion which is journaled on the central hub portion of the clutch member and the cover member is sealed adjacent its radially inner edge to the clutch member but is nonload-bearing so that the entire radial and thrust loading of the body member and cover member is absorbed at the journal between the hub portions of the body and clutch members. This arrangement minimizes bearing friction in the coupling and allows the body member and clutch member to be accurately and consistently located relative to each other so as to accurately control the viscous drive clearances between the clutch member and body member and thereby accurately control the driving forces generated in the coupling.

According to another feature of the invention, the drive from the torque converter housing into the viscous coupling is through an annular clutching surface defined on the outer peripheral portion of the body member and the cover member is secured at its outer peripheral portion to the outer peripheral portion of the body member radially inwardly of the annular clutching surface on the body member. With this arrangement, the drive for the torque converter housing is directly into the body member so that accurate registration of the cover member relative to the body member, and preclusion of relative slippage between the body member and cover member, are no longer critical to the long-term ability of the coupling to continue to operate within design specifications.

These and other objects, features, and advantages of the invention will become apparent from the following Detailed Description of the Preferred Embodiment of the invention.

BRIEF DESCRIPTION OF THE DRAWINGS

FIG. 3 is a fragmentary cross sectional view taken on line 3—3 of FIG. 2.

DETAILED DESCRIPTION OF THE PREFERRED EMBODIMENT

Figure 1:
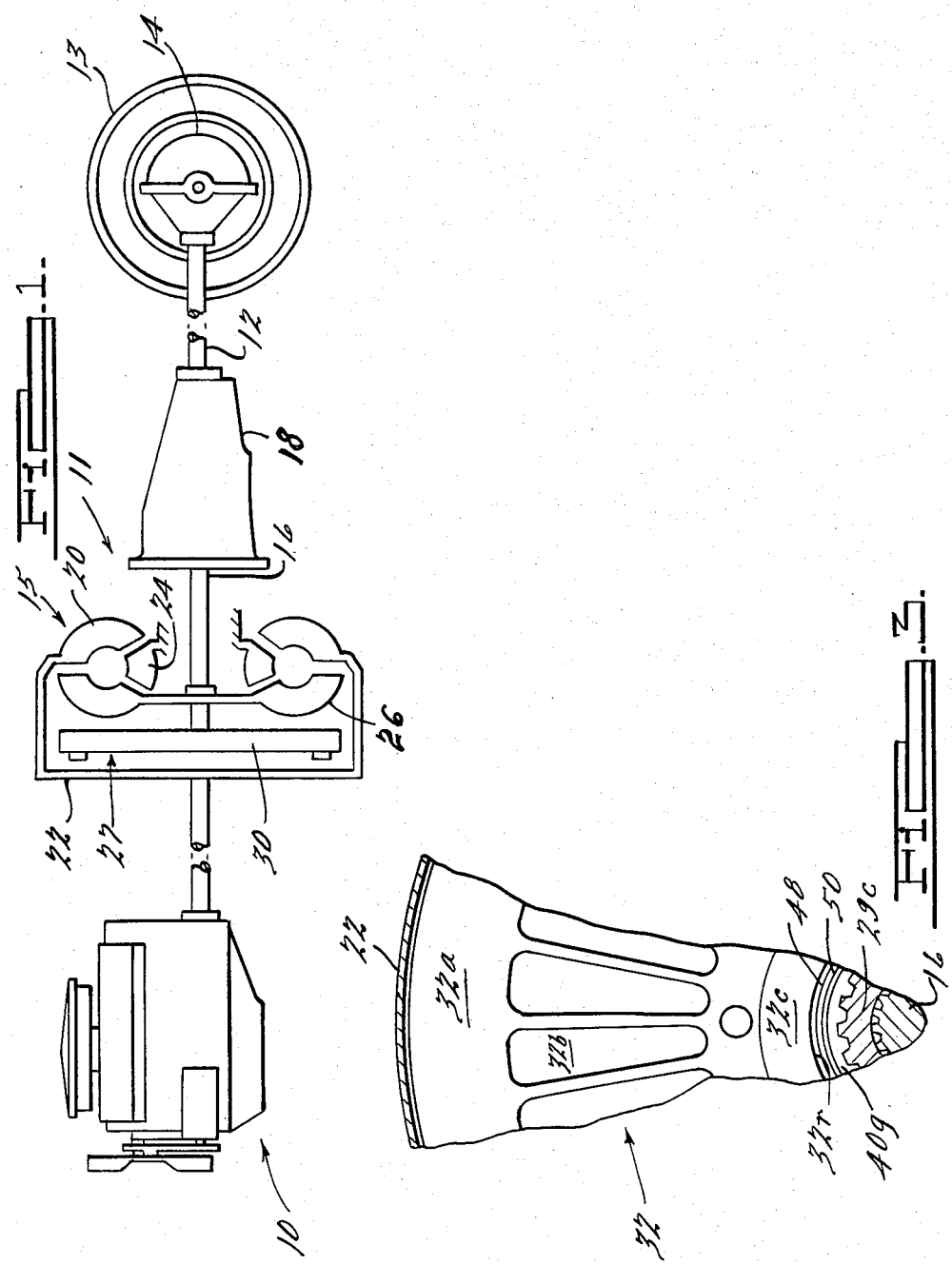
FIG. 1 is a schematic view of a motor vehicle drivetrain including a torque converter type automatic transmission employing a torque converter bypass drive embodying a viscous coupling.

The motor vehicle drivetrain seen schematically in FIG. 1 includes an internal combustion engine 10, an automatic transmission 11 and a propeller shaft 12 driving rear wheels 13 through a differential 14.

Transmission 11 includes a torque converter 15 having an output shaft 16 and a gear ratio box 18 driven by torque converter output shaft 16. Torque converter 15 is filled with automatic transmission fluid and includes, in known manner, a pump 20 driven from engine 10 through torque converter housing 22, a stator 24, and a turbine 26 driven hydrokinetically by pump 20.

Torque converter 15 further includes a bypass drive line seen generally at 27 in FIG. 1. Bypass drive line 27 is effective when actuated to provide a direct drive between torque converter housing 22 and torque converter output shaft 16 through viscous coupling 30 thereby bypassing the high slippage drivepath through pump 20 and turbine 26.

Figure 2:
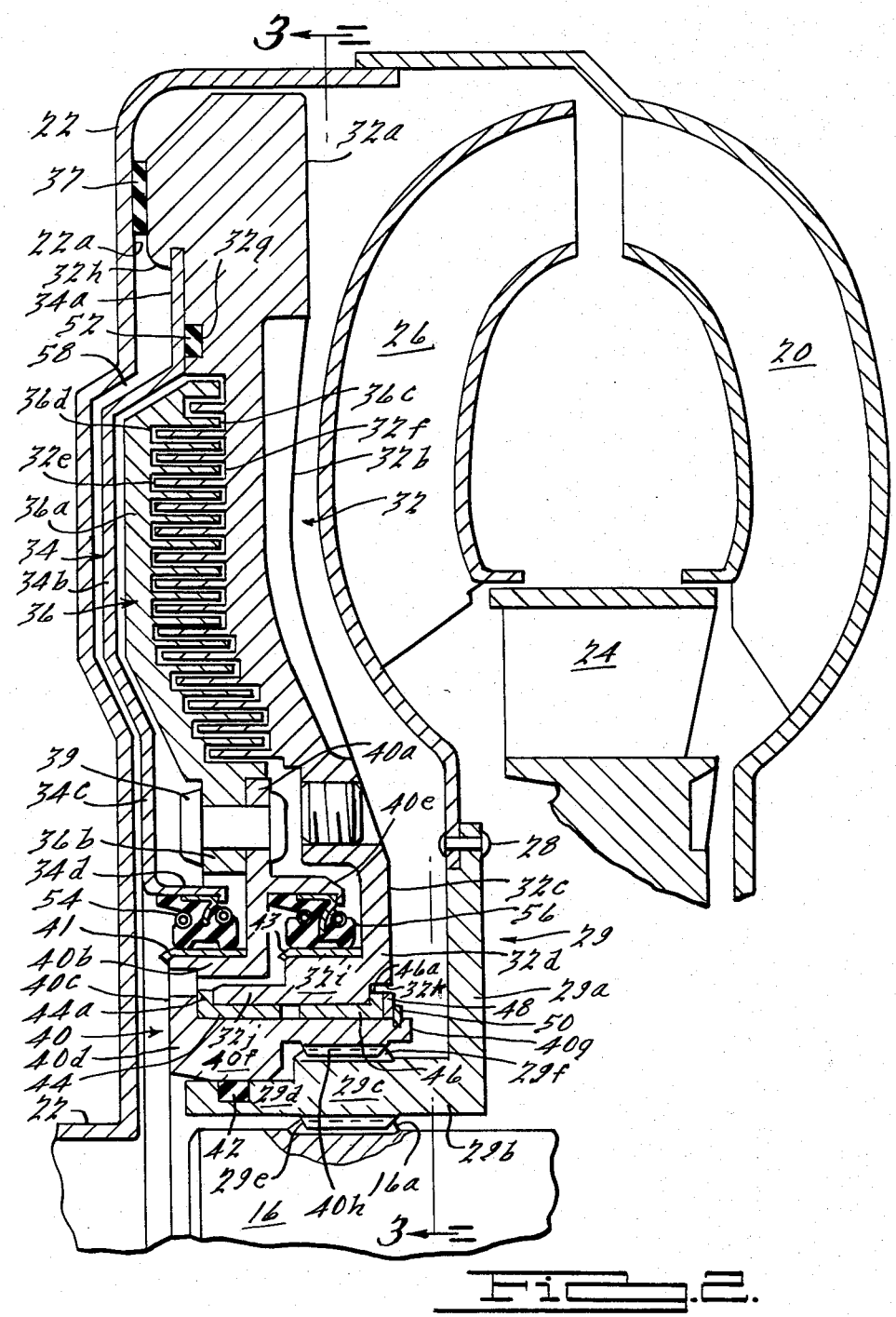
FIG. 2 is a fragmentary cross sectional view on an enlarged scale of the torque converter and viscous coupling bypass seen schematically in FIG. 1.

Turbine 26, as seen in FIG. 2, is secured by rivets 28 to an annular mounting member 29. Mounting member 29 includes an annular radially extending mounting portion 29a and an annular axially extending hub portion 29b extending leftwardly from the radially inner edge of mounting portion 29a. Hub portion 29b in turn includes a relatively thick portion 29c and a relatively thin free end portion 29d. The inner periphery of portion 29b is splined at 29e for coaction with splines 16a on output shaft 16, whereby rotation of turbine 26 effects rotation of output shaft 16.

Viscous coupling 30 is generally circular and generally planar and is of a sandwich construction and includes an annular housing assembly, adapted to be positioned within the housing 22 of the torque converter and having axially spaced annular side wall members defining an annular clutch chamber thebween, and an annular clutch member disposed within the clutch chamber. One side wall of the annular housing is constituted by a body member 32 and the other side wall member of the annular housing is constituted by a cover member 34. Clutch member 36 is interposed between body 32 and cover 34. Cover 34 is preferably formed as a steel stamping and body 32 and clutch 36 are preferably formed as permanent mold aluminum castings.

Body 32 includes a radially outer peripheral portion 32a, an intermediate or radially extending side wall portion 32b, and a radially inner portion 32c terminating in a hub portion 32d extending axially leftwardly as viewed in FIG. 2 from the radially inner edge of inner portion 32c. Intermediate portion 32b is machined on its inner or left, as viewed in FIG. 2, face to form a series of annular lands 32e separated by a series of annular grooves 32f. Another annular groove 32g is machined in the inner face of body 32 radially outwardly of lands and grooves 32e, 32f. An annular clutch lining 37 is adhesively secured to the inner or left face of outer peripheral portion 32a for clutching coaction with the confronting inner surface 22a of torque converter housing 22.

Cover 34 includes a radially outer peripheral portion 34a held in a position seated against the inner or left face of body outer peripheral portion 32a by a rollover 32h on body 32, an intermediate portion 34b, and a radially inner portion 34c terminating in an inwardly, or rightwardly, turned lip portion 34d.

Intermediate portions 32b and 34b of the body and cover are configured to define the chamber which receives clutch 36.

Clutch 36 includes a working portion 36a and an annular radially extending mounting portion 36b. The side of working portion 36a confronting an annular face of the side wall of intermediate portion 32b of body 32 (the right side in FIG. 2) is machined to form a series of annular lands 36c separated by a series of annular grooves 36d for clutching coaction therebetween. Lands 32e on body 32 are interdigitally arranged with respect to lands 36c on clutch 36. Mounting portion 36b is secured by rivets 39 to a clutch hub member 40 which, together with clutch 36, forms an annular clutch assembly.

Clutch hub member 40 is formed as an iron casting and includes an annular radially extending mounting flange or bridge portion 40a receiving rivets 39, an annular axially extending seal or intermediate portion 40b extending leftwardly from the radially inner edge of bridge portion 40a, an annular radially extending end portion 40c, an annular axially extending hub portion 40d extending rightwardly from the radially inner edge of end portion 40c, and an annular flange portion 40e extending axially inwardly, or rightwardly, from flange portion 40a radially inwardly of rivets 39. Annular hub portion 40d in turn includes a relatively thick annular portion 40f and a relatively thin free end portion 40g which nest in complementary fashion with portions 29c and 29d of mounting member hub portion 29b. An annular wear sleeve 41 of hardened steel is pressed onto the outer periphery of portion 40b of clutch hub member 40. The inner periphery of portion 40g is splined at 40h for coaction with splines 29f on the outer periphery of portion 29c of mounting hub member 29. The inner periphery of portion 40f forms a cylindrical sealing surface for coaction with an elastomer square cut sealing ring seal 42 mounted in an annular groove in free end portion 29d of mounting hub member 29.

Hub portion 32d of body 32 includes a relatively thick portion 32i and a relatively thin free end portion 32j. An annular wear sleeve 43 of hardened steel is pressed onto the outer periphery of relatively thick portion 32i. Relatively thin free end portion 32j extends axially into the U-shaped annular cavity defined by portions 40b, 40c and 40d of clutch hub member 40. Hub portion 32d is journaled on clutch hub portion 40d by bronze bushings 44 and 46 pressed onto body hub portion 32d. Bushing 44 is interposed between body hub portion 32j and clutch hub portion 40f with a flange portion 44a positioned between the free end annular edge of body hub portion 32j and the confronting annular surface on clutch hub portion 40c. Bushing 46 is interposed between body hub portion 32i and clutch hub portion 40g with a flange portion 46a received in an annular notch 32k formed in body hub portion 32d. A washer 48, held in place by a snap ring 50 received in a suitable annular groove in clutch hub portion 40g, limits axial movement of clutch hub portion 40d.

Bushings 44 and 46 function to absorb the entire bearing load for body 32 and cover 34. And bushings 44, 46 coact with washer 48 and the inner face of clutch hub portion 40c to accurately locate body 32 with respect to clutch 36 so that the groove spacing between body member annular lands 32e and clutch member annular lands 32c can be accurately controlled. This spacing is critical from a design standpoint since it determines the amount of viscous driving force transmitted from the body to the clutch. The described bushing arrangement, wherein both bushings are press fit into the same bore of the body hub portion and journaled on the same peripheral surface of the clutch hub portion, makes it easier to hold critical tolerances and dimensions so that frictional forces at the bearing interfaces are minimized and so that the critical groove spacing at the viscous interface of the clutch and body may be accurately controlled.

The viscous coupling is filled with a viscous silicone fluid, for example, dimethyl polysiloxane. The silicone liquid is prevented from escaping radially outwardly by an elastomeric square cut sealing ring seal 52 received in annular groove 32g. The silicone fluid is prevented from escaping radially inwardly by a pair of double-lip elastomer seals 54, 56 positioned respectively between the outer periphery of wear sleeve 41 and the confronting inner periphery of cover lip portion 34d, and between the outer periphery of wear sleeve 43 and the confronting inner periphery of flange 40e. Seals 54, 56 also preclude leakage of automatic transmission fluid into the viscous coupling.

In the operation of the bypass drive line 27, automatic transmission fluid is normally admitted to the torque converter environment through the annular passage or chamber 58 formed between cover 34 and torque converter housing 22. The presence of the fluid in chamber 58 acting against cover 34 moves the viscous coupling to the right as viewed in FIG. 2 to its disengaged position (seen in FIG. 1) wherein lining 37 is separated from housing surface 22a to form an annular passage past the lining. The fluid thus flows radially outwardly in passage or chamber 58, past lining 37, and into the main chamber of the torque converter. When it is desired to engage the bypass drive line, as, for example, when the vehicle is operating in a higher gear ratio and above a predetermined vehicle speed, the direction of flow of the automatic transmission fluid in the torque converter is reversed by actuation of a suitable solenoid valve, not shown. Specifically, the automatic transmission fluid is now admitted to the main chamber of the torque converter where it acts against body 32 and slides the viscous coupling to the left as viewed in FIG. 2, to bring lining 37 into frictional engagement with housing surface 22a. The transmission now drives directly through the viscous coupling to output shaft 16, thereby bypassing the torque converter. Although there is a limited amount of slip in the viscous coupling occurring between body 32 and clutch 36, this slippage is significantly less than the slippage in the torque converter so that the overall efficiency of the transmission is significantly increased with corresponding improvements in vehicular fuel economy. And the viscous coupling, because of its cushioning effect, has the effect of eliminating the drive line vibrations that are transmitted to the passenger compartment in prior art bypass drive lines employing a solid mechanical driving connection.

The specific disclosed viscous coupling design provides simple, efficient transmission of power through the viscous coupling. Specifically, since the drive from the torque converter housing is directly into the body member of the coupling, rather than into the cover member as in previous designs, there is less concern for maintaining accurate registration between the cover member and the body member and less concern for relative slippage between the cover member and body member. And since the entire bearing load of the cover member and body member assembly is taken at the journal of the body member on the clutch member, the bearing design is simplified and bearing frictional losses may be minimized as compared to previous designs where the cover member and body member were separately journaled and the separate journals were subject to misalignment with consequent increases in bearing friction, or were subject to counteracting tendencies, with additional consequent increases in bearing friction. The described bearing arrangement, as previously noted, also enables the body member to be accurately and consistently located with respect to the clutch member so that the drive groove spacing between these two members, critical to power transmission through the coupling, may be accurately controlled in a mass production environment.

While a preferred embodiment of the invention has been illustrated and described in detail, it will be apparent that various changes and modifications may be made in the disclosed embodiment without departing from the scope or spirit of the invention.

What is claimed is:

1. A viscous coupling for use as a bypass element in a torque converter transmission including a torque converter housing containing a torque converter having an output shaft, said coupling comprising:
   (A) an annular housing assembly adapted to be positioned within the torque converter housing and having axially spaced, radially extending annular side wall members defining an annular chamber therebetween containing a viscous fluid;
   (B) a radially extending annular clutching surface defined on an outer peripheral portion of said annular housing assembly and adapted for clutching coaction with a confronting inner surface of the torque converter housing;
   (C) an annular clutch assembly disposed within said chamber in the viscous fluid and including:
      1. an annular radially extending portion having working means on an annular side face thereof for clutching coaction with corresponding clutching means on a confronting annular face on one side wall member of said annular housing assembly; and
      2. an annular axially extending hub portion adapted to be drivingly connected to the torque converter output shaft;
   (D) an annular axially extending hub portion defined at a radially inner edge of said one side wall member of said annular housing assembly, said hub portion having radially inner and outer peripheral surfaces, and said inner peripheral surface journaled on the outer peripheral surface of the hub portion of said clutch assembly and providing the sole load bearing support for said annular housing assembly;
   (E) an annular axially extending lip portion defined at a radially inner edge of the other side wall member of said annular housing assembly disposed in spaced, non load-bearing relation to said clutch assembly; and
   (F) a first seal disposed between the radially outer peripheral surface of the hub portion of said one side wall member and a radially inwardly directed, axially extending confronting surface on said clutch assembly; and
   (G) a second seal disposed between a peripheral surface of said lip portion of said other side wall member and a confronting surface on said clutch assembly.

2. A viscous coupling according to claim 1 wherein:
   (H) said second seal is disposed between the radially inner peripheral surface of said lip portion and a radially outwardly directed confronting surface on said clutch assembly.

3. A viscous clutch according to claim 1 wherein:
   (H) said clutch assembly further includes:
      1. an annular end portion extending radially outwardly from one axial end of said clutch assembly hub portion; and
      2. an annular sealing portion extending axially from the radially outer edge of said end portion and forming a U-shaped annular cavity with said hub portion and said end portion; and
   (I) said second seal is disposed between a radially outer peripheral surface of said sealing portion of the clutch assembly and the radially inner peripheral surface of said lip portion of the other side wall member.

4. A viscous coupling according to claim 3 wherein:
   (J) a free end portion of the hub portion of said one side wall member extends axially into said U-shaped annular cavity; and
   (K) said first seal sealingly engages the outer peripheral surface of the hub portion of said one side wall member between the free end portion thereof and its juncture with the radially extending portion of said one side wall member.

5. A viscous coupling according to claim 4 wherein:
   (L) said clutch assembly further includes an annular bridge portion extending radially outwardly from the free end of said sealing portion; and
   (M) the radially inwardly directed axially extending confronting surface on said clutch assembly with which said first seal coacts is defined by a radially inner periphery of a flange extending axially from said bridge portion in concentrically overlying relation to the hub portion of said one side wall member.

6. A viscous coupling according to claim 1 wherein:
(H) said annular housing assembly includes an annular body member and an annular cover member;
(I) said body member constitutes said one side wall member;
(J) said annular clutching surface is defined on the radially outer peripheral portion of said body member; and
(K) said cover member is secured at its radially outer peripheral portion to said body member at a location thereon radially inwardly of said annular clutching surface.

7. A viscous coupling for use as a bypass element in a torque converter transmission including a torque converter housing containing a torque converter having an output shaft, said coupling comprising:
  (A) an annular body member adapted to be positioned within the torque converter housing and having a radially extending outer peripheral portion, a radially extending intermediate portion, and a radially inner portion terminating in a central axially extending hub portion;
  (B) means defining an annular radially extending clutching surface on said outer peripheral portion of said body member adapted for clutching coaction with a confronting inner surface of the torque converter housing;
  (C) an annular cover member having a radially extending outer peripheral portion secured to said outer peripheral portion of said body member at a location thereon radially inwardly of said clutching surface, an annular radially extending intermediate portion spaced axially from the body member intermediate portion to define an annular chamber therebetween containing a viscous fluid, and an annular radially inner portion;
  (D) an annular clutch assembly disposed within said chamber in the viscous fluid and having:
    1. an annular radially extending working portion having means on an annular side face thereof for clutching coaction with corresponding clutching means on a confronting annular face of said body member intermediate portion; and
    2. an annular axially extending hub portion adapted to be drivingly connected to the torque converter output shaft;
  (E) A seal disposed radially outward of the hub portion of the body member and sealing cooperating with the body member and the annular clutch assembly; and
  (F) means journaling the hub portion of said body member on the outer peripheral surface of the hub portion of said clutch assembly, whereby, with said coupling disposed in a position to clutchingly engage the clutching surface on said body member outer peripheral portion with the confronting inner surface on the torque converter housing, the body member is driven by the torque converter housing to viscously drive said clutch assembly and the total bearing load of said body member and cover member is carried at the journal between the body hub portion and the clutch assembly hub portion.

8. A viscous coupling according to claim 7 wherein:
(G) said annular radially extending clutching surface is defined on the left face of said outer peripheral portion of said body member;
(H) said clutch means are defined on the right face of said working portion of said clutch assembly and the left face of the intermediate portion of said body member;
(I) said clutch assembly further includes
  1. an annular end portion extending radially outwardly from the left end of the hub portion of said clutch assembly; and
  2. an annular intermediate portion extending axially rightwardly from the radially outer edge of said end portion and coacting with said hub and end portions to define a U-shaped rightwardly opening annular cavity; and
(J) the hub portion of said body member extends leftwardly from the radially inner edge of said radially inner portion into said U-shaped annular cavity.

9. A viscous coupling for use as a bypass element in a torque converter transmission including a torque converter housing containing a torque converter having an output shaft, said coupling comprising:
  (A) An annular housing assembly adapted to be positioned within the torque converter housing and having axially spaced radially extending left and right annular side wall members defining an annular chamber therebetween containing a viscous fluid;
  (B) an annular radially extending clutching surface defined on the left face of an outer peripheral portion of said annular housing assembly and adapted for clutching coaction with a confronting inner surface of the housing of the torque converter;
  (C) an annular clutch assembly disposed within said chamber in the viscous fluid and including:
    1. an annular radially extending working portion having means on a right annular side face thereof for clutching coaction with corresponding clutching means formed in a confronting left annular face of the right side wall member of said annular housing assembly;
    2. an annular axially extending hub portion adapted to be drivingly connected to the output shaft of the torque converter; and
    3. an annular end portion extending radially outwardly from the left end of said hub portion;
  (D) an annular axially extending hub portion extending leftwardly from a radially inner edge of said right side wall member and having a radially inner peripheral surface journaled on a radially outer peripheral surface of the hub portion of said clutch assembly and providing the sole load bearing support for said annular housing assembly;
  (E) a first bushing including an annular axially extending main body portion interposed between the radially inner peripheral surface of the hub portion of said right side wall member and the radially outer peripheral surface of the hub portion of said clutch assembly and a flange portion extending radially outwardly from the left end of said main body portion and interposed between a left annular edge face of the hub portion of said right side wall member and a confronting annular face on the right side of the end portion of said clutch assembly;
  (F) a second bushing including an annular axially extending main body portion interposed between the radially inner peripheral surface of the hub portion of said right side wall member and the radially outer peripheral surface of the hub portion of said clutch assembly, with its left annular edge spaced to the right of the right annular edge of the main body portion of said first bushing, and a flange portion extending radially outwardly from the right end of the main body portion thereof engaging an annular radially extending surface adjacent the right end of the hub portion of said right side wall member; and (G) means precluding rightward movement of said second bushing relative to the hub portion of said clutch assembly.

10. A viscous coupling according to claim 9 wherein said precluding means comprises a washer positioned on the hub portion of said clutch assembly and precluded from rightward movement relative to that hub portion by a snap ring carried by that hub portion.

11. A viscous coupling for use as a bypass element in a torque converter transmission including a torque converter housing containing a torque convertr having an output shaft, said coupling comprising:

an annular housing assembly adapted to be positioned within the torque converter housing and having axially spaced, radially extending annular side wall members defining an annular chamber therebetween containing a viscous fluid;

means for drivingly connecting said housing assembly with the housing of the torque converter;

an annular clutch assembly disposed within said chamber in the viscous fluid and including:

an annular radially extending portion having working means on an annular side face thereof for clutching coaction with corresponding clutching means on a confronting annular face on one side wall member of said annular housing assembly; and an annular axially extending hub portion adapted to be drivingly connected to the torque converter output shaft;

an annular axially extending hub portion defined at a radially inner edge of said one side wall member of said annular housing assembly, said hub portion having radially inner and outer peripheral surfaces, and said inner peripheral surface journaled on the outer peripheral surface of the hub portion of said clutch assembly and providing the sole load bearing support for said annular housing assembly;

an annular axially extending lip portion defined at a radially inner edge of the other side wall member of said annular housing assembly disposed in spaced, non load-bearing relation to said clutch assembly; and a first seal disposed between the radially outer peripheral surface of the hub portion of said one side wall member and a radially inwardly directed, axially extending confronting surface on said clutch assembly; and a second seal disposed between a peripheral surface of said lip portion of said other side wall member and a confronting surface on said clutch assembly.

12. A viscous coupling according to claim 11 wherein:

said second seal is disposed between the radially inner peripheral surface of said lip portion and a radially outwardly directed confronting surface on said clutch assembly.

13. A viscous clutch according to claim 11 wherein: said clutch assembly further includes:

an annular end portion extending radially outwardly from one axial end of said clutch assembly hub portion; and an annular sealing portion extending axially from the radially outer edge of said end portion and forming a U-shaped annular cavity with said hub portion and said end portion; and said second seal is disposed between the radially outer peripheral surface of said sealing portion of the clutch assembly and the radially inner peripheral surface of said lip portion of the other side wall member.

14. A viscous coupling according to claim 13 wherein:

a free end portion of the hub portion of said one side wall member extends axially into said U-shaped annular cavity; and said first seal sealingly engages the outer peripheral surface of the hub portion of said one side wall member between the free end portion thereof and its juncture with the radially extending portion of said one side wall member.

15. A viscous coupling according to claim 14 wherein:

said clutch assembly further includes an annular bridge portion extending radially outwardly from the free end of said sealing portion; and the radially inwardly directed axially extending confronting surface on said clutch assembly with which said first seal coacts is defined by a radially inner periphery of a flange extending axially from said bridge portion in concentrically overlying relation to the hub portion of said one side wall member.

16. A viscous coupling according to claim 11 wherein:

said annular housing assembly includes an annular body member and an annular cover member;

said body member constitutes said one side wall member;

said body member further includes on an outer peripheral portion thereof a radially extending annular clutching surface adapted for clutching coaction with a confronting inner surface of the housing of the torque converter;

said cover member is secured at its radially outer peripheral portion to said body member at a location thereon radially inwardly of said annular clutching surface.

17. The viscous coupling according to claim 16, wherein said body member defines the right annular side wall member of said annular chamber, a first bushing including an annular axially extending main body portion interposed between the radially inner peripheral surface of the hub portion of said right side wall member and the radially outer peripheral surface of the hub portion of said clutch assembly and a flange portion extending radially outwardly from the left end of said main body portion and interposed between the left annular edge face of the hub portion of said right side wall member and a confronting annular face on the right side of the end portion of said clutch assembly;

a second bushing including an annular axially extending main body portion interposed between the radially inner peripheral surface of the hub portion of said right side wall member and the radially outer peripheral surface of the hub portion of said clutch assembly, with its left annular edge spaced to the right of the right annular edge of the main body portion of said first bushing, and a flange portion extending radially outwardly from the right end of the main body portion thereof engaging an annular radially extending surface adjacent the right end of the hub portion of said right side wall member; and means precluding rightward movement of said second bushing relative to the hub portion of said clutch assembly.

18. A viscous coupling according to claim 17 wherein said precluding means comprises a washer positioned on the hub portion of said clutch assembly and precluded from rightward movement relative to that hub portion by a snap ring carried by that hub portion.

* * * * *